(12) United States Patent
Haines et al.

(10) Patent No.: US 10,387,957 B2
(45) Date of Patent: Aug. 20, 2019

(54) STRUCTURED FUTURES PRODUCTS

(75) Inventors: Thomas Haines, Westfield, NJ (US); Clifford Weber, Basking Ridge, NJ (US)

(73) Assignee: NYSE Group, Inc., New York, NY (US)

(*) Notice: Subject to any disclaimer, the term of this patent is extended or adjusted under 35 U.S.C. 154(b) by 1534 days.

(21) Appl. No.: 12/651,345

(22) Filed: Dec. 31, 2009

(65) Prior Publication Data

US 2011/0055112 A1 Mar. 3, 2011

Related U.S. Application Data

(60) Provisional application No. 61/239,340, filed on Sep. 2, 2009, provisional application No. 61/239,349, filed on Sep. 2, 2009.

(51) Int. Cl.
*G06Q 40/00* (2012.01)
*G06Q 40/06* (2012.01)

(52) U.S. Cl.
CPC .................................. *G06Q 40/06* (2013.01)

(58) Field of Classification Search
CPC ..................................................... G06Q 40/06
See application file for complete search history.

(56) References Cited

U.S. PATENT DOCUMENTS

| | | | |
|---|---|---|---|
| 2005/0075961 A1* | 4/2005 | McGill | 705/35 |
| 2006/0036533 A1* | 2/2006 | Frankel et al. | 705/37 |
| 2007/0192226 A1* | 8/2007 | Uhlmann | G06Q 40/00 |
| | | | 705/36 R |
| 2007/0203855 A1* | 8/2007 | Fisher | 705/36 R |
| 2007/0233594 A1* | 10/2007 | Nafeh | 705/37 |
| 2007/0299753 A1* | 12/2007 | Averbuch et al. | 705/35 |
| 2008/0027847 A1* | 1/2008 | Masucci | 705/36 R |
| 2008/0228559 A1* | 9/2008 | Kianpoor | G06Q 40/06 |
| | | | 705/36 R |
| 2009/0063364 A1* | 3/2009 | O'Connell | G06Q 20/10 |
| | | | 705/36 R |
| 2009/0182660 A1* | 7/2009 | Jokisch et al. | 705/37 |
| 2010/0070429 A1* | 3/2010 | Spurgin | G06Q 40/06 |
| | | | 705/36 R |
| 2011/0119170 A1* | 5/2011 | Winter | G06Q 40/04 |
| | | | 705/37 |

OTHER PUBLICATIONS

Sep. 1, 2010 International Appl. No. PCT/US 10/02412 Notification of Transmittal of the International Search Report and the Written Opinion of the International Searching Authority, or the Declaration.

* cited by examiner

*Primary Examiner* — Jason Borlinghaus
(74) *Attorney, Agent, or Firm* — DLA Piper LLP (US)

(57) ABSTRACT

Systems and methods for creating and trading structured futures and various vehicles to allow nearly equivalent financial instruments to be created and traded on exchanges are described, including computer systems and computer implemented methods that allow the creation and trading of structured futures and related financial instruments. Computer systems and methods may be used to calculate the value of structured futures and related financial instruments before maturity and their payoff value at maturity.

18 Claims, 3 Drawing Sheets

STRUCTURED FUTURES PRODUCTS

CROSS REFERENCE TO RELATED APPLICATION

This application claims priority to U.S. provisional Patent Application Ser. No. 61/239,340, filed Sep. 2, 2009 and U.S. Ser. No. 61/239,349, filed Sep. 2, 2009.

FIELD OF THE INVENTION

This invention relates to futures contracts and investment products based on futures contracts, where the futures contracts and investment products may be traded on an exchange, and systems and methods for calculating information relating to the values of the futures, the products and underlying indices.

BACKGROUND

Investment vehicles take many forms, and can be designed to give investors varying levels of potential returns and exposure to loss. The investment vehicles referred to as "structured products" are designed to provide simplified means to achieve complicated risk/return objectives by modifying the payoff structure of an underlying reference asset or index. Structured products are most often issued by investment banks, which accept funds from an investor or investors and provide in return, for example, a note, which promises to pay an amount on some future date certain based on the performance of a specified asset or index. Structured products can also take the form of certificates of deposit or other instruments. There are, however, inherent limitations for structured products that this invention addresses and overcomes. Those limitations include issuer credit risk, the inability to qualify for listing and trading on US exchanges, and difficulties with valuation and transparency of pricing. As a consequence, demand in the US for these products is limited. The value of structured product investments measured as a percentage of GDP is much smaller in the US than in Europe and Japan, which have, among other things, lower regulatory barriers for broad offerings of structured products.

When the structured product is in the form of a note, the amount paid on the note depends on its payoff structure. For example, the payoff structure of many structured notes is designed with a view to limiting the risk of loss of principal invested in the note, the performance of which is tied to the performance of an underlying asset, while still benefitting from gains in the underlying asset. This type of note is typically referred to as a principal protected note. FIG. 1 shows the payoff structure for a simple example of a principal protected note. In this example, the horizontal axis represents the return on a reference security (Rs) and the vertical axis represents the return on the structured note (Rn). When the return on the underlying security (Rs) is negative, i.e., when the security has declined in value, the return on the note is flat at zero, indicating no loss of principal invested. When the return on the underlying security is positive, i.e., when the security has increased in value, the return on the note is likewise positive, although less positive than the return on the underlying security. The returns are generated through a combination of investments.

Structured products provide simple vehicles for replicating more complex transactions. For example, the principal protected structured product shown in FIG. 1 replicates the combination of investments shown in FIG. 2. In this example, an investor buys the structured note from a bank for $1000 at time t0 with a maturity date at some later time t1. The bank-issued note's payoff structure replicates the combination of investing a portion 101 of the principal amount in a low-risk investment such as a bond with a maturity date at t1, and the remainder 102 in a call option on the underlying security with a strike price equal to the value of the security at time t0 and with an expiration date of t1. The amount invested in the bond 101 is determined so that, given the time to maturity and the rate of return on the bond, the value of the bond at maturity (t1) is the same as the principal amount invested, $1000, thus preserving the investor's full investment regardless of whether the underlying security has advanced 103 or declined 104. If at time t1 the security has advanced 103, the call option will have a value related to the amount of appreciation in the underlying security, thus allowing the investor to participate in the appreciation in the underlying security. If the security declined 104, however, the call option would expire worthless, but the investor's initial investment still would be protected by the value of the bond at maturity.

At the same time that structured products provide simplified means to achieve complicated risk/return objectives, they have certain inherent limitations that this invention addresses and overcomes.

First, a major drawback of structured products in the form of notes is issuer credit risk. Structured notes typically are unsecured debt of the issuer, usually an investment bank, and as such, the ultimate payoff of the note—regardless of the performance of the underlying asset—depends on the issuer's ability to meet its payment obligations. These notes also are not insured by the FDIC nor are they collateralized by other means. As a result, there remains the possibility of loss of principal for reasons unconnected to the performance of the underlying asset, making the notes less attractive as an investment opportunity.

In addition, investors—in particular retail investors—often do not fully appreciate that issuer credit is a factor in the likelihood of return of principal and in fact sometimes incorrectly assume that their initial investment is fully guaranteed. When Lehman Brothers declared bankruptcy, holders of "Principal Protected Notes" issued by Lehman Brothers found that their principal investment was not, in fact, protected from Lehman Brothers' default and lost most of their investments in the notes. As a consequence, the volume of structured note issuances has declined significantly following the Lehman bankruptcy as investors have become more aware of, and concerned with, issuer credit risk. This concern has resulted in a particular need in the art for structured products that minimize credit risk.

Some issuers have addressed credit concerns by issuing structured certificates of deposit ("structured CDs"), which are guaranteed by the Federal Deposit Insurance Corporation (FDIC). There are, however, several limitations to structured CDs. First, the amount of investment covered by the FDIC guarantee is capped, and structured CD investments are aggregated with other insured deposits at the same institution in applying that cap. Additionally, there is some uncertainty as to whether or not the FDIC guarantee for structured CDs will continue to be available indefinitely. Further, structured CDs are not securities and are therefore not eligible to be listed and traded on a national securities exchange (see further discussion below), and so there are limited mechanisms for investors to get out of their investments, at a loss or otherwise, before the investment reaches maturity.

A second disadvantage of structured products is that most do not meet the initial distribution requirements necessary for exchange listing. These requirements include minimum distribution thresholds which serve as a indicators of sufficient supply and ownership base to provide for reasonably liquid secondary market trading on the exchange. For example, a non-redeemable structured note must have been sold to at least 400 public holders and have issued at least 1,000,000 shares worth at least $4 million. The inability of many structured products to meet the listing requirements forces such products to trade in the over-the-counter markets and preclude exchange listing.

Exchange listing provides many benefits to investors. One of the most important benefits of exchange listing is that it gives investors a dependable and transparent way to divest themselves of their investment prior to maturity by selling to another investor. This ability to buy and sell throughout the trading day typically is referred to as "liquidity," and exchange-listed products generally have liquidity. Structured products that are not exchange-listed are more likely to have liquidity limitations.

Further, since exchanges provide a transparent venue for buyers and sellers to indicate prices at which they are willing to buy or sell a security and facilitate those transactions when buyer and seller agree on price, and since information about these prices is publicly disseminated, exchange listing is an important means for discovering the fair market price of any financial product, including listed structured products. In other words, exchange listing helps ensure that investors can sell their investment at a fair price if they do not wish to hold their investment to maturity. Finally, investors benefit from exchange listing because of the heightened regulation that exists for listed financial products.

A third disadvantage to currently available structured products, and to structured notes in particular, is that they typically do not allow for creation of additional notes to accommodate demand. The inability to issue additional products in response to demand may lead to material mispricing versus the fair value of the underlying structured payout terms—that is, heightened demand that is not met by increased availability will result in a higher price that does not accurately reflect the prospective value of the underlying payout.

Other patents have attempted to address certain aspects of the invention, but none addresses all of the aspects of the invention. For example, Bodurtha et al. (U.S. Pat. No. 7,433,839) covers some of the issues associated with the difficulty of selling futures to retail investors, but does not address in any manner the efficient delivery of risk return profiles similar to structured products. Frankel et al. (U.S. Pat. Appl. Pub. No. 2006/0036533) also address the ability to deliver futures to retail investors, although somewhat differently than Bodurtha, by placing such futures in a trust for distribution within a security structure. However, like Bodurtha, Frankel fails to address in any manner the efficient delivery of risk return profiles similar to structured products. Finally, Kao et al. (U.S. Pat. No. 7,475,033) addresses the concept of creating a principal protected structured payout in a security, in this case via a trust holding a combination of over-the-counter (OTC) options and treasury securities. In contrast to futures contracts, these OTC option contracts represent bilateral arrangements between two parties without a central clearing house. However, Koo fails to address to provide for payout structures other than principal protection and does not specifically address credit risk concerns, pricing transparency and the complex valuation associated with current structured products There is thus a need in the financial industry to provide a financial instrument that: (1) efficiently provides desirable risk/return profiles similar to those provided by existing structured products, (2) does not carry issuer credit risk, (3) can be listed and traded on an exchange, (4) has transparent pricing or simple valuation, and/or (5) can readily be sold to retail investors.

SUMMARY

It is thus an object of the invention to provide financial instruments that can efficiently provide desirable risk/return profiles, that can be exchange traded or sold to retail investors, that have transparent pricing, and that do not carry issuer credit risk.

In one embodiment the invention includes a method for calculating a structured payoff modified index for a futures contract with a structured payoff, comprising the steps of: determining a payoff structure and underlying reference asset for the structured payoff modified index; determining the term for the structured payoff modified index; obtaining a value for the underlying reference asset of the structured payoff modified index by a computer; applying the payoff structure for the structured payoff modified index by the computer to the underlying reference asset of the structured payoff modified index; outputting by the computer a value calculated by the applying step; and publishing the value outputted by the computer as the final settlement value for the futures contract. The method may further comprise publishing the value outputted by the computer before expiry of the term for the structured payoff modified index. The method may further comprise distributing shares of an exchange traded fund that holds the futures contract. The method may further comprise distributing certificates of trust, wherein the trust holds the futures contract. The method may further comprise distributing exchange traded notes, wherein the payoff value of the exchange traded note is the same as that of the structured future.

In another embodiment the invention includes a method for calculating the payment due on a futures contract with a structured payoff, comprising the steps of: determining a payoff structure and underlying asset for the futures contract; determining the term for the futures contract; obtaining a value for the underlying reference asset of the structured payoff modified index by a computer; applying the payoff structure for the futures contract by the computer to the underlying asset of the futures contract; outputting by the computer a value calculated by the applying step; and publishing the value outputted by the computer as the final settlement value for the futures contract. The method may further comprise publishing the value outputted by the computer before expiry of the term for the structured payoff modified index. The method may further comprise distributing shares of an exchange traded fund that holds the futures contract. The method may further comprise distributing certificates of trust, wherein the trust holds the futures contract. The method may further comprise distributing exchange traded notes, wherein the payoff value of the exchange traded note is the same as that of the structured future.

In another embodiment the invention includes a product comprising a futures contract with a structured payoff, wherein the payment due on the futures contract is calculated by: determining a payoff structure and underlying asset for the futures contract; determining the term for the futures contract; obtaining a value for the underlying reference asset of the structured payoff modified index by a computer; applying the payoff structure for the futures contract by a computer to the underlying asset of the futures contract; outputting by the computer a value calculated by the applying step; and publishing the value outputted by the computer as the final settlement value for the futures contract. The value outputted by the computer may be published before expiry of the term for the structured payoff modified index. Shares of an exchange traded fund that holds the futures contract may be distributed. Certificates of trust holding the futures contract may be distributed. Exchange traded notes with a payoff value the same as that of the structured future may be distributed.

DESCRIPTIONS OF THE FIGURES

DETAILED DESCRIPTION

Figure 1:
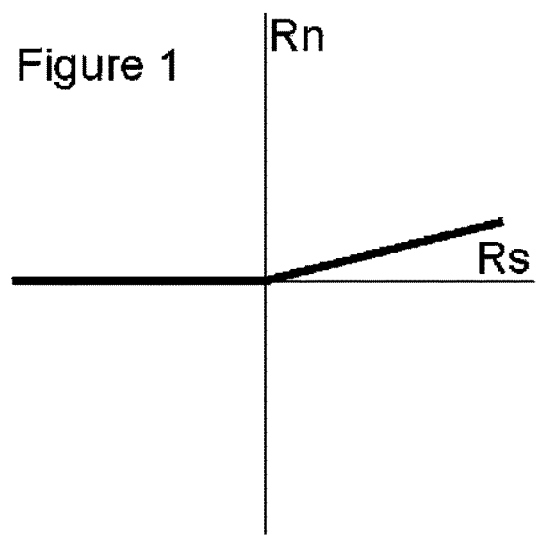
FIG. 1 is a graph showing the return of a principal protected structured product as a function of the return of the underlying.
Figure 2:
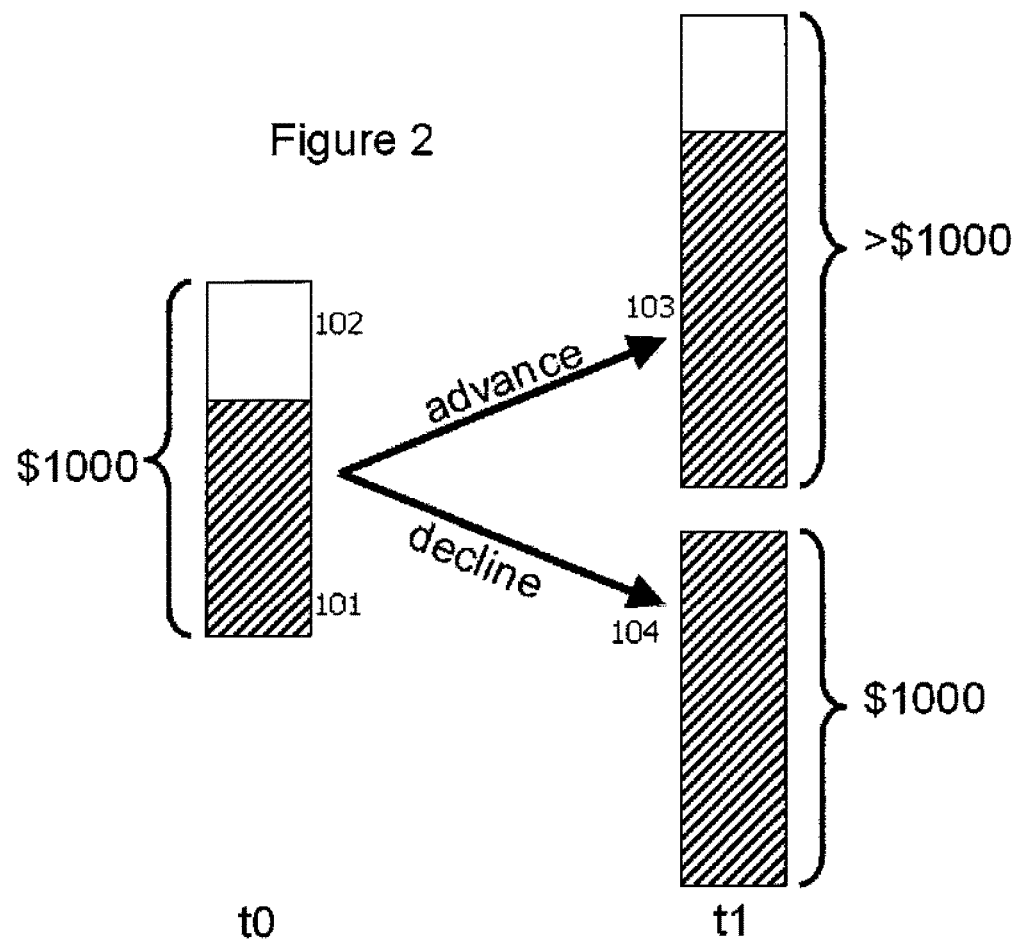
FIG. 2 depicts how a principal protected structured product replicates a more complex series of transactions.

Most structured products in the prior art are bank-issued debt, which entails credit risk for the investor. The structured products of the present invention, by contrast, are futures contracts issued by a central clearinghouse, or are financial instruments based on such futures contracts. For such centrally-cleared futures contracts, the clearinghouse acts as the counterparty to buyer and seller of every outstanding contract and holds performance bonds ("margin") posted by dealers to assure performance on the dealers' and their customers' futures obligations. Through this central clearing and margining mechanism, the credit risk associated with structured notes is essentially eliminated. Additionally, since futures contracts are listed for trading on derivatives exchanges, investors get the benefits of liquidity and price discovery provided by the exchange listing that may not be available in existing structured product constructs. Further, futures contracts do not need to meet or be exempt from state securities law requirements in order to list for trading.

Structured futures contracts allow for open interest (i.e., the number of contracts outstanding) to increase or decrease in response to changes in demand. This ability for supply to change to meet demand helps keep pricing of structured futures more closely aligned with underlying fair value than traditional structured notes which have a fixed issuance.

The structured futures of the present invention differ from traditional futures contracts, however, in that the payout on expiration of the contract contains elements of structuring similar to traditional structured products. In fact, the structured products of the invention can have any of the return profiles available through the prior art structured products while maintaining the benefits of exchange-traded futures contracts. These profiles include, but are not limited to, upside leveraged returns with or without a cap, downside leveraged returns with or without a cap, principal protection, barrier or range futures, and reverse convertibles. Additionally, like traditional futures, structured futures may be settled by delivery in cash or by physical delivery of the underlying asset(s). As used herein, the terms "structured payoff" and "payoff structure" mean any payoff that has any structure other than a one-to-one dependence on the underlying asset.

There are at least two alternative approaches to creating structured futures according to the invention. In one embodiment, the structured payout is specified in the terms of the futures contract, and the underlying asset is unmodified. On expiration, the futures contract's settlement value is determined by applying the structuring elements as specified in the contract terms to the current value of the underlying asset. For example, the underlying reference asset for a structured future might be gold, and the structured terms of the futures contract might be that the expiration settlement price for the contract equals the price of gold, but not more than $1,250 per ounce nor less than $750 per ounce.

In another embodiment, the structured payout elements are built into the underlying asset's returns to create a "structured payout-modified index" ("SPMI"). As used herein, the term "structured payout-modified index", or "SPMI" refers to an index based on the value of any security, bond, or generally any instrument with a value that can be determined at any given time, or any basket, group or index of such assets, where the return profile has been modified in a defined manner. That is, the index has embedded in it some element(s) of structuring of the underlying reference asset returns. In the "SPMI" embodiment, the value of the futures contract on expiration is simply the value of the underlying "structured index." The futures contract terms do not incorporate the structuring elements directly. This embodiment is preferred because it does not entail modifications to the standard futures contract terms, which could require substantial technology and operational work at the clearing firms to process transactions in these contracts. An example of this embodiment analogous to the example above would create an SPMI which is equal to the price of gold, unless the price of gold exceeds $1,250 or falls below $750, in which case the SPMI value is $1,250 and $750 respectively. A traditional futures contract then would be listed and traded on this SPMI.

The structured futures of the invention can be based on any single reference asset or basket of assets, or it may be based on an index that tracks the return of a group of stocks, bonds, rates, economic indicators, derivatives, commodities, currencies, or any combination of the above, or other potential investments. The structured futures of the invention typically will be based on a reference asset the value of which is publicly disseminated.

In the foregoing embodiments, the structured futures of the invention are traded on an exchange in the same way that standard listed derivative instruments are traded, including through OTC block transactions, exchange for physical transactions, etc. Thus, in principle, listed structured futures may be traded off exchange, but reported by exchanges and cleared through exchange central clearinghouses. Further, in recent years, facilities have developed to allow for central clearing of transactions that occur over the counter in contracts that are not listed for trading in the exchange's central order book. Structured futures also can be cleared in this manner, alleviating credit concerns of bilateral OTC transactions.

However, not all investors transact in futures contracts. Futures contracts are leveraged investments. In a typical futures contract, a $1 movement in the underlying asset results in a much greater movement in the value of the future—as much as 50 or 100 times, or more. This factor is generally called the "contract multiplier." Further, as mentioned earlier, parties to a futures contract are required to post margin to ensure performance against the contract. Since such margin requirements typically are much lower than the notional value of the underlying asset covered by the future, futures contracts provide significant leverage. Because futures are leveraged instruments, requiring only a small portion of the contract value to be covered by margin amounts, retail and institutional investors have to meet certain standards in order to use them. Further, the leveraged nature of futures contracts may not appeal to all qualified investors. Therefore, additional embodiments of the invention may be desirable to allow for greater distribution of the structured instruments whereby more investors can take advantage of the benefits these products offer, but without the effects of leverage. This "deleveraging" of the structured futures may be accomplished by combining a position in the structured future with investment in an appropriate amount of cash or securities so that any percentage change in the asset underlying the future is matched by the same percentage change in the combined future and cash/securities position. This deleveraging process may occur in any number of ways, including through a separate security that holds both the structured future and cash or securities; through the establishment of positions in the structured future and cash or securities outside of a separate security; through the specification of terms of the structured future itself (such as contract multiplier and margin requirements) such that the structured future itself does not provide leverage; etc.

In one embodiment, the structured futures may be held in an open-ended trust, which may allow periodic, for example daily, cash or in-kind creations and redemptions, and which may issue shares as an SEC-registered exchange-traded fund. This embodiment might qualify for listing on a national securities exchange pursuant to existing listing standards, which has the benefit of not requiring large scale distribution—initial issuance of only 100,000 shares is required Additionally, because the open-ended trust structure provides an arbitrage mechanism which ensures that the secondary market price of the trust's shares does not materially diverge from the per-share value of the trust assets (i.e., the structured future plus cash and securities held by the trust to deleverage the future).

An open-ended trust may be set up with or without a defined maturity date. In either case, the maturity date of the structured future may be earlier than the maturity date of the trust. In that case, the trust may "roll" its position from an expiring structured future to another structured future with a further out maturity date. This new structured future may have the same or different structured terms as the expiring contract. For example, a trust may hold structured futures that reference an underlying principal protected SPMI with a payoff structure such as that shown in FIG. 1, and with a maturity date of Dec. 31, 2010. On Dec. 31, 2010, the trust would receive the payout from the structured futures held, and reinvest the proceeds in a structured future with the same payout structure, but with a maturity date of Dec. 31, 2011. Alternatively, at some time before the maturity of the underlying structured future, the trust may exchange the underlying structured future for a new structured future with the same payout structure but with the later maturity date. In the event that the open-end trust has a defined maturity date equal to the maturity date of the structured future, there would be no need to roll the futures contract.

It is anticipated that many current issuers of exchange-traded funds (ETFs) would find the open-ended trust embodiment of the invention attractive because it would involve minimal change to their existing practices.

Furthermore, the credit risks associated with structured products are alleviated by this structure, because shares of the open-end trust are not unsecured debt of an issuer, but rather are backed by the actual holdings of the trust. Since the trust would hold a combination of centrally-cleared structured futures, cash and securities. There is essentially no credit risk exposure associated with holding any of these instruments.

In another embodiment, the structured futures may be held in a closed-end trust where, unlike an open-ended trust, the number of shares outstanding is fixed on issuance. In this embodiment, the issuer could rely on an underwriting process similar to that of traditional public securities offerings, and underwriting fees could be built into the price of shares of the trust, thus allowing for large scale distributions and compensation to the issuer. In order to meet the standards for listing on a national securities exchange (and thereby be exempt from "blue sky" regulations), the issue must be to at least 400 shareholders, be of at least 1 million shares, and be worth at least $4 million. However, because the closed-end embodiment lacks the arbitrage mechanism of the open-end embodiment, the secondary market prices for shares of this embodiment may trade at significant premiums or discounts to the per-share value of the assets held in the trust.

In yet another embodiment, the secondary market price of the structured future may be used as a reference value for an exchange traded note (ETN) with elements of structuring built into the ETN payoff pattern. Such a structured ETN ("SETN") would be similar in concept to traditional structured products in the form of unsecured debt, but would allow for the periodic issuance of additional notes and redemption of existing notes. In order to determine the price at which SETNs should be issued and redeemed during the life of the note, the secondary market prices of a similarly structured futures contract may be used to calculate daily redemption values for the note, and to provide the market with an indication as to the value of the note at any time during the trading day. Unlike closed-end trusts, in order to be listed on major exchanges such as NYSE Arca, ETNs only must meet the initial distribution requirement of $4 million. Distribution need not be among a large number of investors. The structured ETN embodiment would benefit from a broad maturity range of between 1 and 30 years, and the periodic creation/redemption feature would ensure that the notes would trade at minimal premiums or discounts. However, one problem with structured ETNs is that they would not address credit risk concerns because they would remain unsecured debt of the issuer.

At least one of the steps of the methods of the invention is preferably implemented by a computer. For example, while the price at any given time before maturity of the security (open-end trust, closed-end fund or exchange-traded note) linked to a structured future will be based on the trading prices of the structured future, the payoff of the security at maturity may be determined by a computer programmed to calculate and output the payoff value of the structured future. In the embodiment where the structured future payoff is based on the value of an SPMI index, such index may be calculated and disseminated at regular intervals during the life of the futures contract (e.g., every 15 seconds, every 5 minutes, once per day, etc.) and will serve as the final settlement value on expiration. In the alternative embodiment where the structured future is based on an unconstrained underlying asset and the payoff structure embedded in the future's contract terms rather than an SPMI, then a computer may be used to determine and output the payoff value of the contract at expiration based on the application of the payoff structure embedded in the future's contract terms to the value of the underlying asset at maturity. In some embodiments where one or more structured futures are held by a fund or trust, a computer may be used to calculate and output an estimate of the fair value of the fund or trust shares throughout the trading day—the "Intraday Optimized Portfolio Value" (IOPV)—based on the trading prices of the structured futures held by the fund or trust on the futures exchange, plus the market value of security positions held by the fund, plus any cash held by the trust or fund, minus fees and expenses.

Exchange Traded Funds

Figure 3:
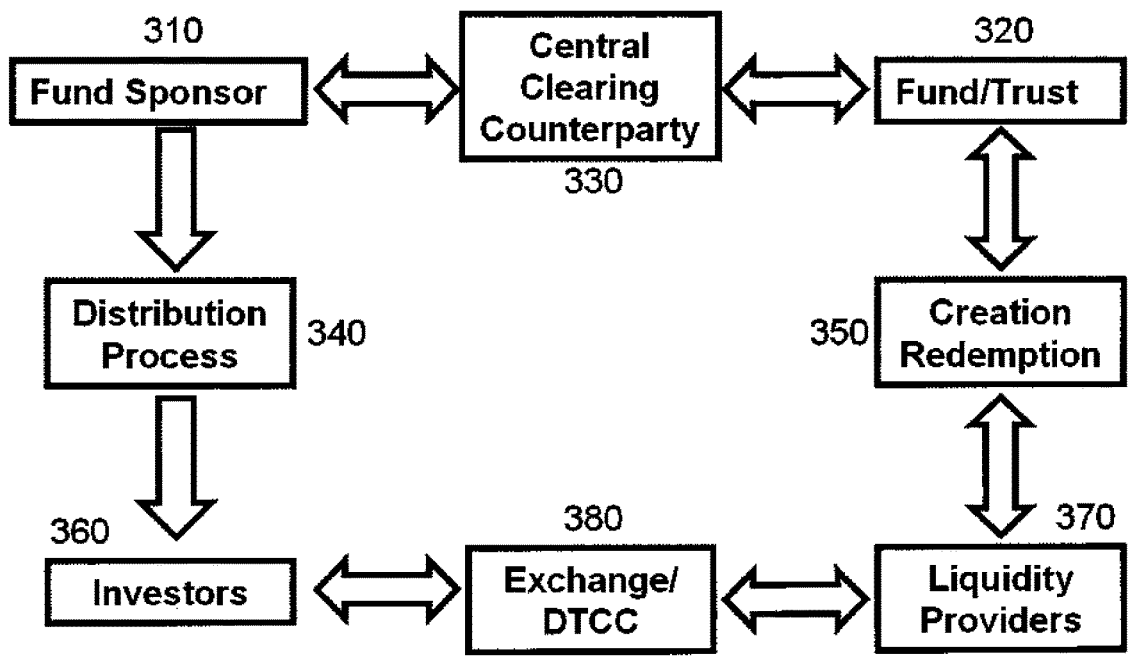
FIG. 3 is a schematic diagram showing how the exchange-traded fund embodiment of the invention may be created and traded.

One embodiment of the open-end structured futures security is the exchange-traded fund (ETF) shown in FIG. 3. While referred to as ETF, this structure also includes open-ended trusts which aren't technically funds, but widely are referred to as ETFs. For this example, we will use the case where the ETF is an open-end trust, but not a fund. In this embodiment, the ETF sponsor 310 may be a bank, liquidity provider, or other entity that can create a trust 320. (As used herein, the term "liquidity provider" refers to any entity that facilitates the purchase and sale by investors on a secondary market such as an exchange. This includes, for example, market makers, lead market makers, specialists, authorized participants, etc.) The ETF sponsor 310 creates a trust 320, and engages a third party trustee to administer it. The administrative costs of the ETF may include compensation for the sponsor and trustee as well as other service providers to the ETF. The ETF sponsor or similar party 310 and the ETF 320 enter into a block transaction whereby the sponsor sells (i.e., establishes a short position in) the associated structured future and through the actions of the third party trustee, the ETF purchases (i.e., establishes a long position in) the future. The sponsor may at the same time deposit an appropriate amount of cash or securities in the trust to "deleverage" the futures positions, as discussed above. The sponsor or an affiliate may act as liquidity provider in the ETF shares, and as such, the short position taken may offset long positions in the ETF shares that aren't distributed to investors. Alternatively, or additionally, other parties may act as liquidity providers 370 by creating ETF shares using a similar process as described above. In all cases, transactions in the structured future are cleared through a central clearing counterparty 330, such as the Options Clearing Corporation. This structure eliminates credit risk because the ETF 320 holds structured futures whose payment is guaranteed by the central clearing counterparty, which subjects the parties to daily margin requirements.

The transactions that allow the ETF to take a long position in the structured futures and the ETF sponsor to take a short position in the structured future can be accomplished electronically using computers communicating through a computer communications network. An ETF sponsor computer can place an order electronically for a short sale of a structured future with a futures exchange, the futures exchange computer receiving the electronic order and matching it with an order placed electronically through an ETF computer for the purchase of a long position in the structured future. The ETF computer and ETF sponsor computer can be programmed with software to cause the computers to place long and short orders with the futures exchange. Alternatively, a computer method may be used to capture and report the occurrence of an off-exchange block transaction between the ETF and the sponsor or other liquidity provider.

The ETF 320 can distribute shares through cash, in-kind, or other creation/redemption processes 350. In the creation process, the ETF 320 accepts in kind the same structured futures held by the ETF and cash, or some specified portfolio of securities with a specific cash value, from liquidity providers 370. In exchange, the ETF 320 distributes a block of shares of the ETF worth the same amount of cash or other securities, where the value of the shares of the ETF is determined by the value of its net assets—i.e., the market value of the futures, cash and other securities it holds, less accumulated expenses. In the redemption process, the ETF 320 accepts a block of shares of the ETF from liquidity providers 370. In exchange, the ETF distributes to liquidity providers 370 the structured futures held by the ETF and cash or securities worth the same amount as the block of ETF shares, where the value of the shares of the ETF is determined by the value of its net assets. Note that instead of creation and redemption being performed directly with a liquidity provider, if the liquidity provider is not a member of the central clearing house for ETF transactions, and therefore does not itself clear and settle transactions in the ETF, such process may in fact occur between the liquidity provider's clearing firm or other entity that is authorized to transact directly with the Trust. This creation and redemption process can be performed over a computer network using a fund computer and a creator/redeemer computer, where the creator/redeemer sends creation and redemption orders to the fund and transacts with the fund as described above. The transactions may be reported by the fund computer and/or the liquidity provider computer over a computer network to a clearing house, such as the Options Clearing Corporation, if the transaction involves the exchange of structured futures or options, and/or the Depository Trust and Clearing Corporation (DTCC) with respect to the exchange of shares of the fund and/or other securities.

Figure 6:
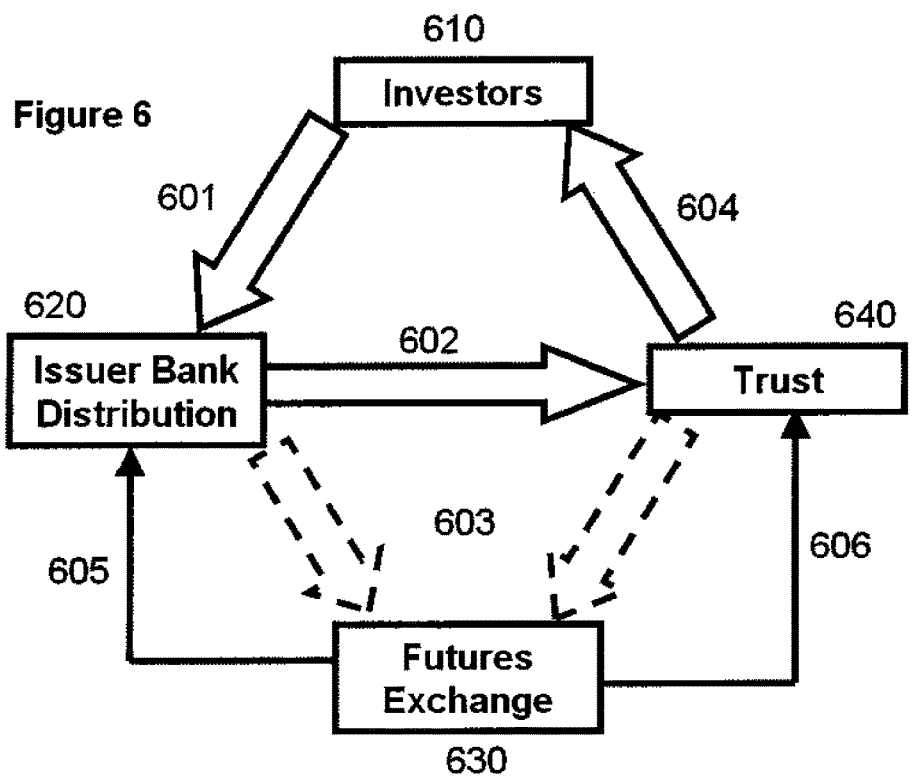
FIG. 6 is a diagram showing the trust creation process.

In a parallel distribution process 340, the fund sponsor 310 can distribute shares of the fund to investors 360 through its own distribution channels, for example, through its brokers and marketing divisions. The sponsor solicits interest from its customers in purchasing ETF shares prior to this transaction and these assets may be deposited with the trust to deleverage the futures positions held by the trust. In return for their deposits, the investors receive ETF shares. FIG. 6 summarizes this process in greater detail. If a bank is the sponsor, it can market and distribute the fund shares through its financial advisors. The fund sponsor 310 and investors 360 can use fund sponsor computers and investor computers to execute the investors' purchase of fund shares.

Investors 360 can trade shares of the trust on secondary markets such as exchanges 380 using DTCC clearing, similar to other exchange traded funds. Shares of a security may be purchased or sold by investor 360 on an exchange 380, for example, through a broker. Clearance of the trade may occur during the trading day or the same evening, after the exchange closes. The exchange interfaces with the National Securities Clearing Corporation (NSCC) of the Depository Trust and Clearing Corporation (DTCC), sending data about the trade, including the counterparties, the number of shares and identity of the security, the price, the settlement date and so forth. The NSCC acts as the central counterparty to the transaction on the following trading day, and guarantees that the transaction will settle on the third trading day following the transaction. The DTCC compares the data provided by the exchange with data provided by the broker and determines whether there is a conflict. If there is a conflict between the broker's data regarding the trade and the exchange's data regarding the trade, then the DTCC sends the broker and exchange a notice of the conflict. Any conflicts are resolved on the next trading day, and whatever party made the error corrects the error in the party's records and resubmits the correct data to the DTCC. If there is no "natural" counterparty to a trade (i.e., no party looking to buy from a seller or sell to a buyer as part of its investing or hedging strategy), liquidity providers 370 may act as counterparties to sell and buy shares of the fund from natural buyers and sellers, respectively.

For any fund holding structured futures, the fund sponsor 310, the trustee, the exchange 380, or another party can calculate an estimate of fair value of the fund shares throughout the trading day (typically called the Intraday Optimized Portfolio Value (IOPV)) based on the trading prices on the exchange of futures held by the fund, plus any cash or security positions held by the fund, minus fees and fund expenses. The trading price of the fund shares themselves should remain close to the IOPV because arbitrageurs can monitor the structured futures prices in the secondary market, and if they believe that the fund shares are trading at a meaningful premium to the fair value implied by the futures price, can sell the fund shares in the secondary market, buy the structured futures and use those structured futures (along with appropriate cash required by the fund) to create new fund shares to deliver against the earlier sale. The arbitrageur profits by the differential between the purchase price of the future and the sale price of the fund share. If the fund shares are sufficiently underpriced in the secondary market relative to the structured future, then the above mechanism can be reversed by the arbitrageur for a profit.

For an ETF with a defined maturity date, a final distribution value of the ETF shares on maturity will need to be determined, based on the closing market values of the holdings of the ETFs, including the structured futures. To the extent the maturity date of the ETF corresponds with the maturity date of the structured future, the final settlement value of the structured future based on the calculated SPMI will be used instead of a market price. For an ETF without a defined maturity date, no such final distribution value needs to be calculated. An indefinite maturity may be preferred for the exchange traded fund embodiment because the costs of setting up such a fund are less material to returns the longer the product exists.

Trust Certificates

Figure 4:
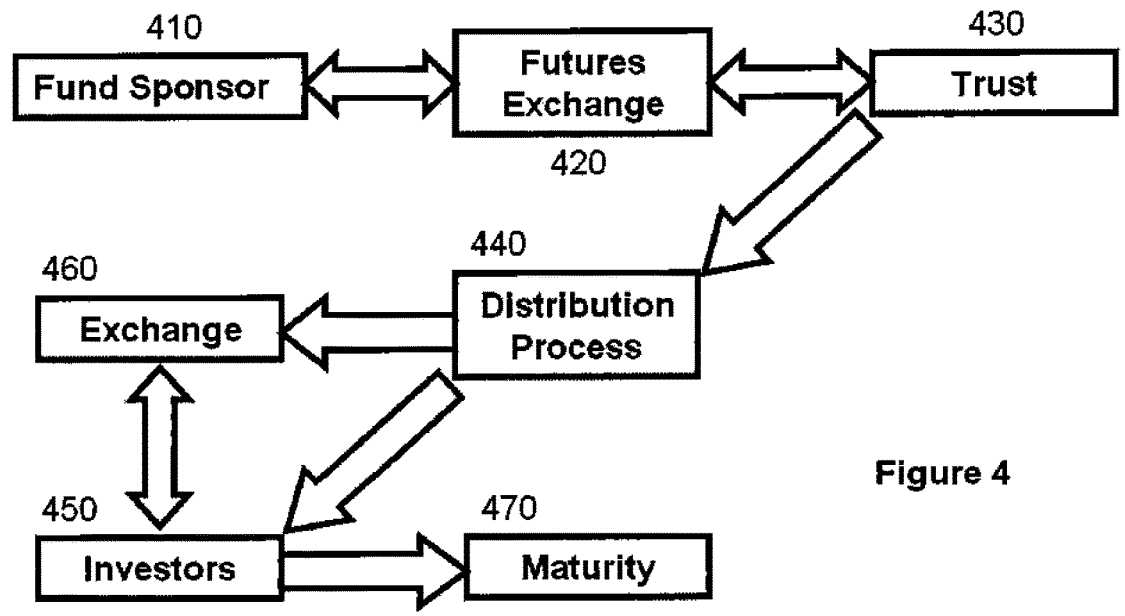
FIG. 4 is a schematic diagram showing how the trust certificate embodiment of the invention may be created and traded.

In an alternative embodiment shown in FIG. 4, structured futures can be held in a trust certificate, or closed-end fund. This embodiment may be preferred over the open-end fund embodiment described above if the fund has a definite maturity date. The trust certificate embodiment would be useful for investors to buy and hold to maturity because the setup costs are lower.

The closed-end trust sponsor 410 can raise assets for the trust by going through an underwriting process. The sponsor 410 may be a bank or liquidity provider. Provided equity exchange distribution standards are met, the trust may list on an equities exchange. The sponsor 410 may be compensated through an underwriting fee that is deducted prior to the trusts initial public offering on the equity exchange.

A third party trustee, for example a bank, creates and administers the trust 430. The trust sponsor 410, the trustee, and a futures exchange 420 coordinate the offering of structured futures on the futures exchange 420. The trust sponsor 410 and trust 430 are counterparties to the purchase of structured futures on the futures exchange 420. Through the actions of the third party trustee, the trust 430 takes a long position in the structured futures and the issuer's broker dealer or independent market makers take short positions in the structured futures to offset the risk they carry by holding shares of the trust. The transaction is cleared through a central clearing counterparty, for example, the Options Clearing Corporation. This eliminates credit risk because the trust 430 holds structured futures whose payment is guaranteed by the central clearing counterparty, which subjects the parties to daily margin requirements. As in the exchange traded fund embodiment described above, fund sponsor 410, trust 430, and futures exchange computer systems and networks may be used to conduct these transactions electronically.

Distribution 440 of trust shares may be through listing on an equities exchange 460 or through direct sales to investors 450. Investors 450 may trade trust shares on the equities exchange 460 at negotiated prices based on the trading prices for the underlying structured futures on the futures exchange 420. Exchange trading in this embodiment is the same as described above for open-end funds. The primary difference is that upon maturity of the underlying future, the trust 430 also matures and pays investors 450 holding shares of the trust their proportional shares of the payout.

In alternative embodiments, structured futures vehicles may include short dated and long dated exchange traded notes (ETNs). The distinction between short dated and long dated ETNs is primarily that short dated ETNs may reference a single structured futures contract and mature at the same time as the structured futures contract, whereas long dated ETNs may reference a subsequent structured futures contract upon expiration of a preceding structured futures contract. For example, a short dated ETN can mature in 1-5 years, whereas a long dated ETN can mature in 5-30 years by referencing a series of structured futures contracts with the same terms, but with later and later maturity dates.

Short Dated ETNs

Figure 5:
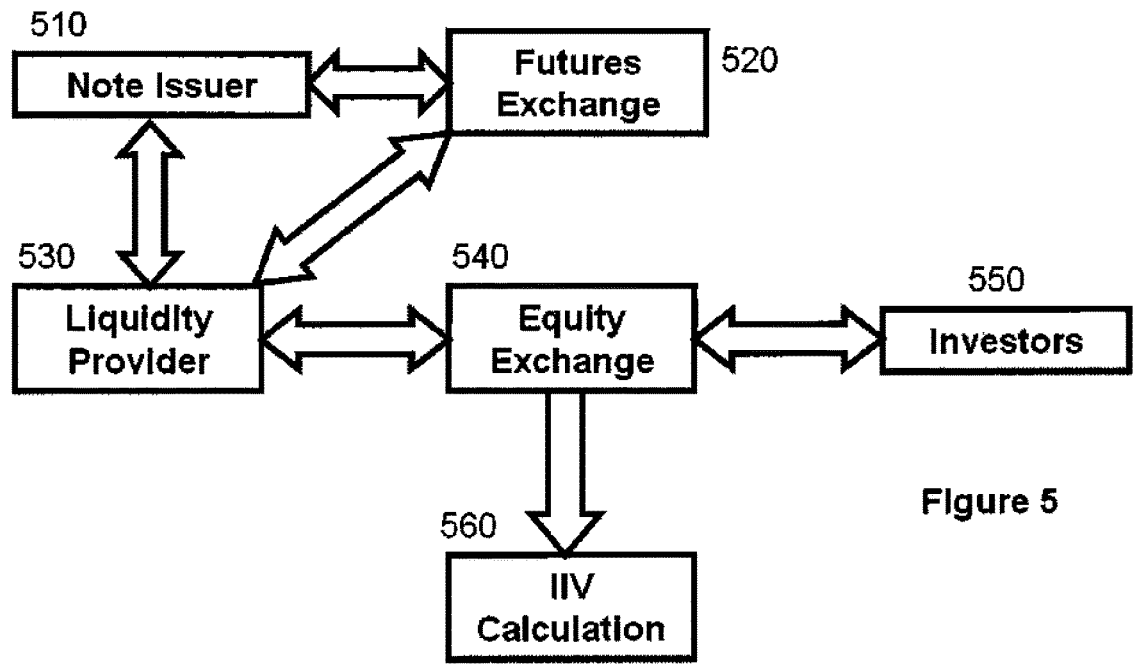
FIG. 5 is a schematic diagram showing how the exchange-traded notes embodiment of the invention may be created and traded.

FIG. 5 shows a short dated exchange traded note embodiment of the invention. In this embodiment, the issuer 510 issues unsecured debt, a note that tracks a structured future index (SPMI). To minimize credit risk, the issuer may be required to redeem the note weekly based on the value of the structured future, as determined by its price on the futures market. The issuer coordinates with a futures exchange 520 to time the issuance of the note with the issuance of a corresponding structured future that underlies the SPMI. The issuers' note may be an ETN that can trade on an equity exchange 540. Investors 550 trade the ETNs on the exchange 540 as described in the embodiments above. Liquidity providers 530 can perform market arbitrage by redemptions transactions with the note issuer 510 on at least a weekly basis. The issuer also may issue additional shares of the notes throughout its life. The liquidity providers 530 can hedge positions in the ETN through offsetting their positions with the corresponding structured futures listed on the futures exchange 520. Creation and redemption values can be calculated based on the value of the structured future traded on the futures exchange 520.

The exchange 540 or major market vendor can perform an intra-day indicative value (IIV) calculation 560, the results of which are publicly disclosed to the market at regular intervals, for example, every 15 seconds. The IIV calculation can be based on the trading price of the corresponding structured future that trades on the futures exchange.

Long Dated ETNs

Long dated ETNs can be created and traded using the same systems and methods described above for short dated ETNs. Like in the indefinite maturity ETF embodiment described above, the long dated ETNs reference subsequent structured futures upon maturity of the preceding structured futures. Thus, in the IIV calculation, upon maturity of one reference structured future, the IIV will be based on the traded prices of the next structured future as traded on the futures exchange.

FIG. 6 is a diagram showing a trust creation process. In step 601 investors 610 transfer payment of funds for shares of the trust 640 to the issuer bank 620. In step 602, the issuer bank 620 deposits the net proceeds from the investors 610 with the trust 640. In step 603 the issuer bank 620 and the trust 640 take opposite sides of structured futures contracts through a futures exchange 630, where the issuer bank 620 takes a short position 605 in the structured futures and the trust 640 takes a long position 606 in the structured futures. In step 604, the trust 640 issues shares of the trust to the investors 610.

While the invention has been described in terms of specific embodiments, those specific embodiments are not intended to limit the scope of the following claims.

We claim:

1. A method comprising:
  creating a product having a return profile from a first product having a return profile without modifying terms of the first product and without modifying the downstream processing systems, comprising:
    generating, by at least one upstream computer, a structured payout modified index ("SPMI") by embedding one or more payout structuring elements into a financial index that is based on at least one financial instrument, the at least one upstream computer comprising a non-transitory memory storing computer-readable instructions and a processor executing the computer-readable instructions;
    determining a final settlement value, based on the SPMI, for the first product, the final settlement value embodying the payout structuring elements of the SPMI, comprising:
      identifying, by the at least one upstream computer, an underlying reference asset of the first product,
      determining, by the at least one upstream computer, a payoff structure for the SPMI, said payoff structure defining a value for the first product that depends, at least in part, on a value of the underlying reference asset after the one or more payout structuring elements of the SPMI have been applied to said underlying reference asset value,
      determining, by the at least one upstream computer, a term for the first product,
      obtaining, by the at least one upstream computer, the value of the underlying reference asset at a respective at least one predetermined time during the term of the first product,
      applying, by the at least one upstream computer, the one or more payout structuring elements to the at least one value of the underlying reference asset according to the payoff structure to create a SPMI value,
      determining, by the at least one upstream computer, the final settlement value for the first product based on the SPMI value and applying the final settlement value to the first product, thereby creating said product, and
      transmitting, by the at least one upstream computer, the product having the applied final settlement value to at least one downstream electronic clearing system from among the downstream processing systems; and
    processing, by the at least one downstream electronic clearing system from among the downstream processing systems, the product according to the payout structuring elements embodied in the final settlement value.

2. The method of claim 1, further comprising publishing the SPMI value before expiry of the term for the first product.

3. The method of claim 1, further comprising holding the first product in an exchange traded fund and distributing the shares of the exchange traded fund that holds the first product.

4. The method of claim 1, further comprising distributing certificates of trust, wherein the trust holds the first product.

5. The method of claim 1, further comprising distributing at least a first exchange traded note, wherein a payoff value of the at least first exchange traded note is the same as that of the first product.

6. A method comprising:
  creating, by at least one computer of an electronic exchange coupled to a computer communications network, a product having a return profile from a first product having a return profile, the first product associated with an unmodified underlying reference asset, wherein the computer comprises a non-transitory memory storing computer-readable instructions and a processor executing the computer-readable instructions, said creating comprising:
    determining a final settlement value for the first product, the final settlement value embodying payout structuring elements by:
      determining, by the at least one computer, a payoff structure for the first product,
      applying one or more payout structuring elements to an underlying reference asset value, the payoff structure defining a value for the first product that depends, at least in part, on a value of the underlying reference asset after the one more payout structuring elements have been applied to said underlying reference asset value,
      determining, by the at least one computer, a term for the first product,
      obtaining, by the at least one computer, the value of the underlying reference asset at an expiration of the term of the first product,
      applying, by the at least one computer, the one or more payout structuring elements to the value of the underlying reference asset at the expiration of the term according to the payoff structure to form a maturity value of the underlying reference asset,
      determining, by the at least one computer, the final settlement value for the first product based on the maturity value and applying the final settlement value to the first product, thereby creating said product, and
      transmitting, by the at least one upstream computer, the product having the applied final settlement value to at least one downstream electronic clearing system from among the downstream processing systems; and
    processing, by the at least one downstream electronic clearing system from among the downstream processing systems, the product according to the payout structuring elements.

7. The method of claim 6, further comprising publishing the maturity value outputted by the computer before expiry of the term for the first product.

8. The method of claim 6, further comprising holding the first product in an exchange traded fund and distributing shares of the exchange traded fund that holds the first product.

9. The method of claim 6, further comprising distributing certificates of trust, wherein the trust holds the first product.

10. The method of claim 6, further comprising distributing at least a first exchange traded note, wherein a payoff value of the at least first exchange traded note is the same as that of the first product.

11. An apparatus comprising:
a processor; and
a storage device in communication with said processor and storing instructions configured to cause the processor to:
receive, from an entity computer, over a computer communications network, a first product having a return profile, the first product based on an unmodified underlying reference asset;
create a product having a return profile from the first product by executing the instructions to further cause the processor to:
determine a final settlement value for the first product, the final settlement value embodying payout structuring elements, by executing the instructions to further cause the processor to:
determine a payoff structure for the first product, such that the payoff structure defines a value for the first product that depends, at least in part, on a value of the underlying reference asset after applying one or more payout structuring elements to said underlying reference asset value,
determine a team for the first product,
obtain the value of the underlying reference asset at an expiration of the term of the first product,
apply the one or more payout structuring elements to the value of the underlying reference asset at the expiration of the term to form a maturity value,
determine the final settlement value for the first product based on the maturity value, thereby creating said product, and
transmit, by the at least one upstream computer, the product having the final settlement value to at least one downstream electronic clearing system from among the downstream processing systems; and
process, by the at least one downstream electronic clearing system from among the downstream processing systems, the product according to the payout structuring elements.

12. The apparatus of claim 11, wherein the maturity value is published before expiry of the term for the first product.

13. The apparatus of claim 11, further comprising instructions configured to cause the processor to:
cause an exchange traded fund to hold the first product; and
cause the distribution of shares of the exchange traded fund that holds the first product.

14. The apparatus of claim 11, further comprising instructions configured to cause the processor to:
cause the distribution of certificates of trust holding the first product.

15. The apparatus of claim 11, further comprising instructions configured to cause the processor to:
cause the distribution of exchange traded notes with a payoff value the same as that of the first product.

16. The method of claim 1, further comprising:
publishing the SPMI value as the final settlement value for the first product.

17. The method of claim 6, further comprising:
publishing the maturity value as the final settlement value for the first product.

18. The apparatus of claim 11, further comprising instructions configured to cause the processor to:
cause the publication of the maturity value as the final settlement value for the first product.

* * * * *